July 12, 1960 D. HARTKE ET AL 2,945,183

DELAY GENERATOR

Filed Aug. 8, 1956 8 Sheets-Sheet 1

INVENTORS
Dexter Hartke
Marvin J. Willrodt
BY
Fehr & Swain
ATTORNEYS

INVENTORS
Dexter Hartke
Marvin J. Willrodt
BY Fehr and Swain
ATTORNEYS

INVENTORS
Dexter Hartke
Marvin J. Willrodt
BY
Fleher & Swain
ATTORNEYS

July 12, 1960 D. HARTKE ET AL 2,945,183

DELAY GENERATOR

Filed Aug. 8, 1956 8 Sheets-Sheet 4

INVENTORS
Dexter Hartke
Marvin J. Willrodt

BY Fletcher & Swain

ATTORNEYS

July 12, 1960 D. HARTKE ET AL 2,945,183

DELAY GENERATOR

Filed Aug. 8, 1956 8 Sheets-Sheet 5

INVENTORS
Dexter Hartke
Marvin J. Willrodt
BY [signature]
ATTORNEYS

INVENTORS
Dexter Hartke
Marvin J. Willrodt
BY
ATTORNEYS.

INVENTORS
Dexter Hartke
Marvin J. Willrodt
BY
Fleher and Swain
ATTORNEYS

July 12, 1960 D. HARTKE ET AL 2,945,183

DELAY GENERATOR

Filed Aug. 8, 1956 8 Sheets-Sheet 8

INVENTORS
Dexter Hartke
Marvin J. Willrodt
BY Fisher and Swain
ATTORNEYS

United States Patent Office 2,945,183
Patented July 12, 1960

2,945,183
DELAY GENERATOR

Dexter Hartke, Saratoga, and Marvin J. Willrodt, Menlo Park, Calif., assignors to Hewlett-Packard Company, Palo Alto, Calif., a corporation of California Filed Aug. 8, 1956, Ser. No. 602,741
2 Claims. (Cl. 328—48)

This invention relates generally to delay generators. The term "delay generator" as used herein refers to a circuit which provides one or more output pulses, at preselected periods of time after the occurrence of an event.

Certain prior art digital delay generators employ a plurality of cascaded electronic decade counters which serve to count timing pulses. The counters are adapted to be pre-set to the complement to the number of pulses required to give the desired delay. That is, the counters are pre-set to a count whereby the number of desired pulses added thereto will bring each of of the decade counters to its highest count. The initiating event serves to start a pulse train which is applied to and counted by the counters. When the number of pulses required for the predetermined delay has been counted, each of the counters reaches its highest count and an output pulse is formed. As a result of the mode of operation, the counters may be pre-set to gate only one output pulse for each cycle of operation.

It is a general object of the present invention to provide an improved delay generator.

It is another object of the present invention to provide a delay generator which is capable of forming a plurality of output pulses each having an independently predetermined time delay.

It is another object of the present invention to provide a delay generator which comprises a plurality of decade counters which are pre-set directly to the count which gives the desired delay.

It is a further object of the present invention to provide a pre-set counter in which gates serve to control the application of pulses to the decade counters which are connected to receive the input pulses in parallel.

It is a further object of the present invention to provide a decade counter of the above character in which timing pulses are gated to initiate output pulses.

It is a further object of the present invention to provide a delay generator which is capable of producing pulses at a predetermined delay after the occurrence of an event and in which the delay is accurate within one-tenth microsecond or better.

It is a further object of the present invention to provide a novel rate generator for use with a delay generator.

It is still a further object of the present invention to provide a rate generator in which the frequency of operation is relatively independent of the supply voltage.

It is a further object of the present invention to provide a novel discriminator which serves to reset the counting and associated circuits when the last pulse of several output pulses is formed, regardless of order of said pulses.

It is still a further object of the present invention to provide a delay generator which employs beam switching tubes and novel means for automatically forming or reforming the beam in the same.

It is a further object of the present invention to provide a delay generator in which the output may be coupled to the input to form a precision frequency generator.

These and other objects of the present invention will become more clearly apparent from the following description and accompanying drawings.

Referring to the drawing.

Figure 7:
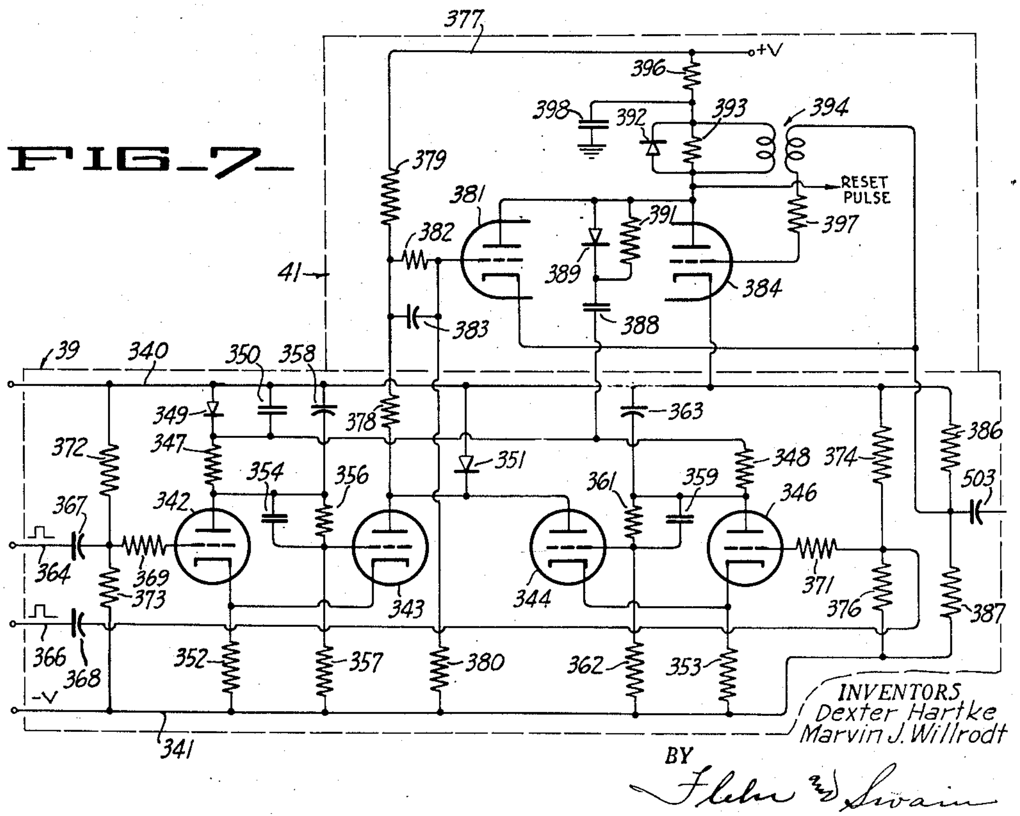
Figure 5B:
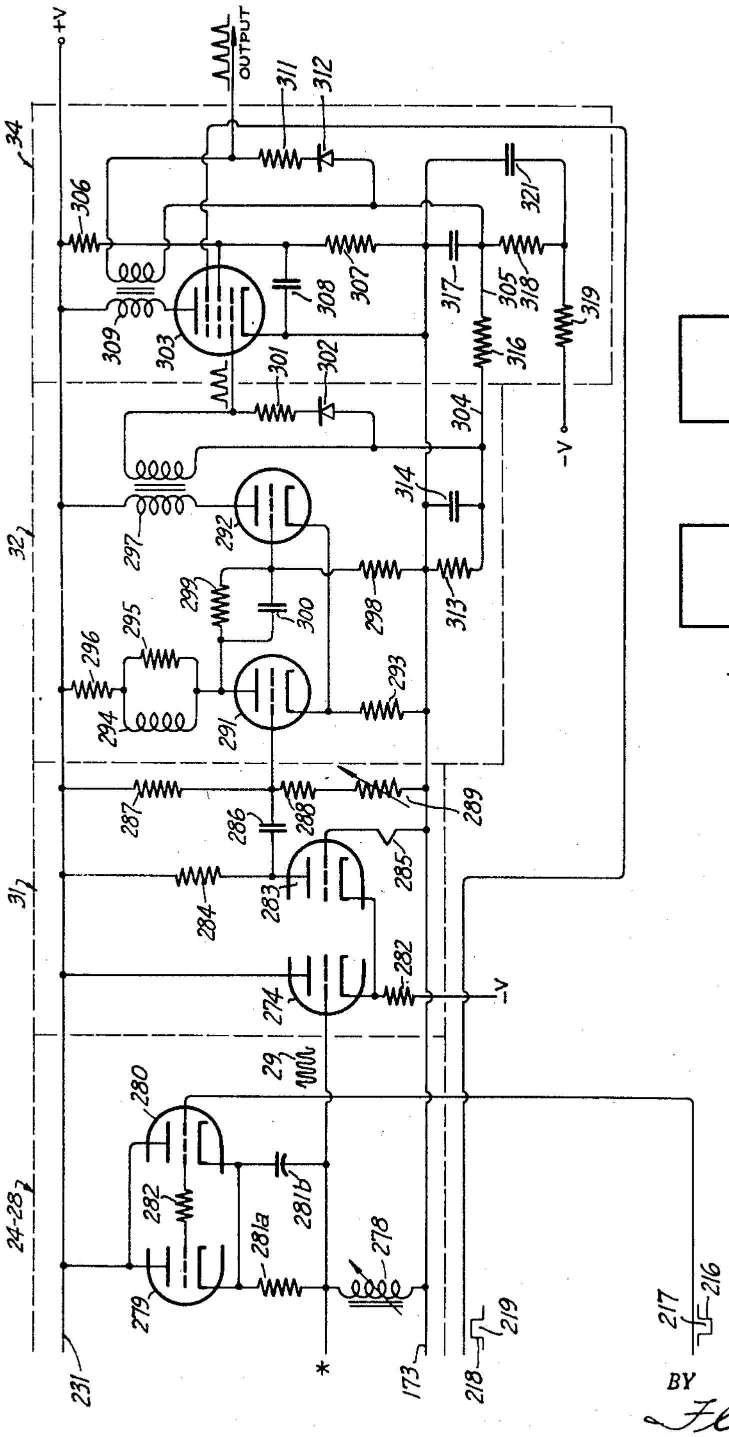
Figure 4:
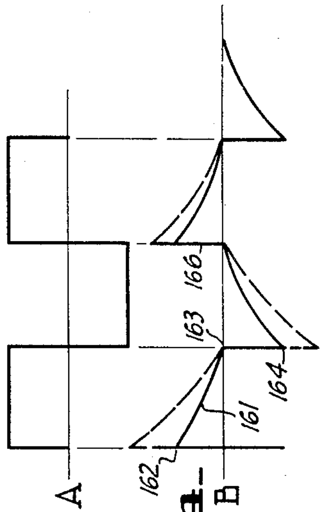
Figure 5A:
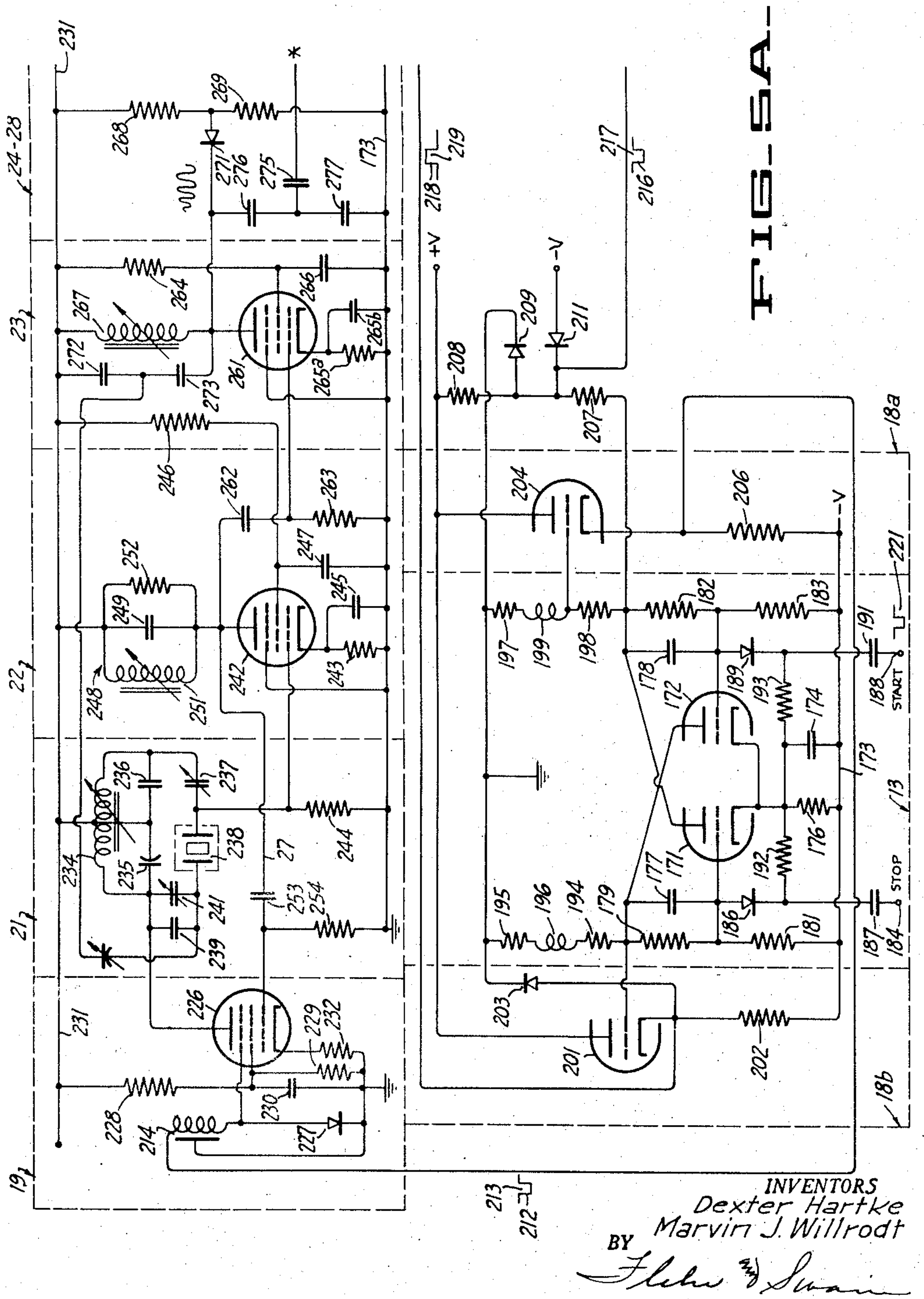
Figure 9:
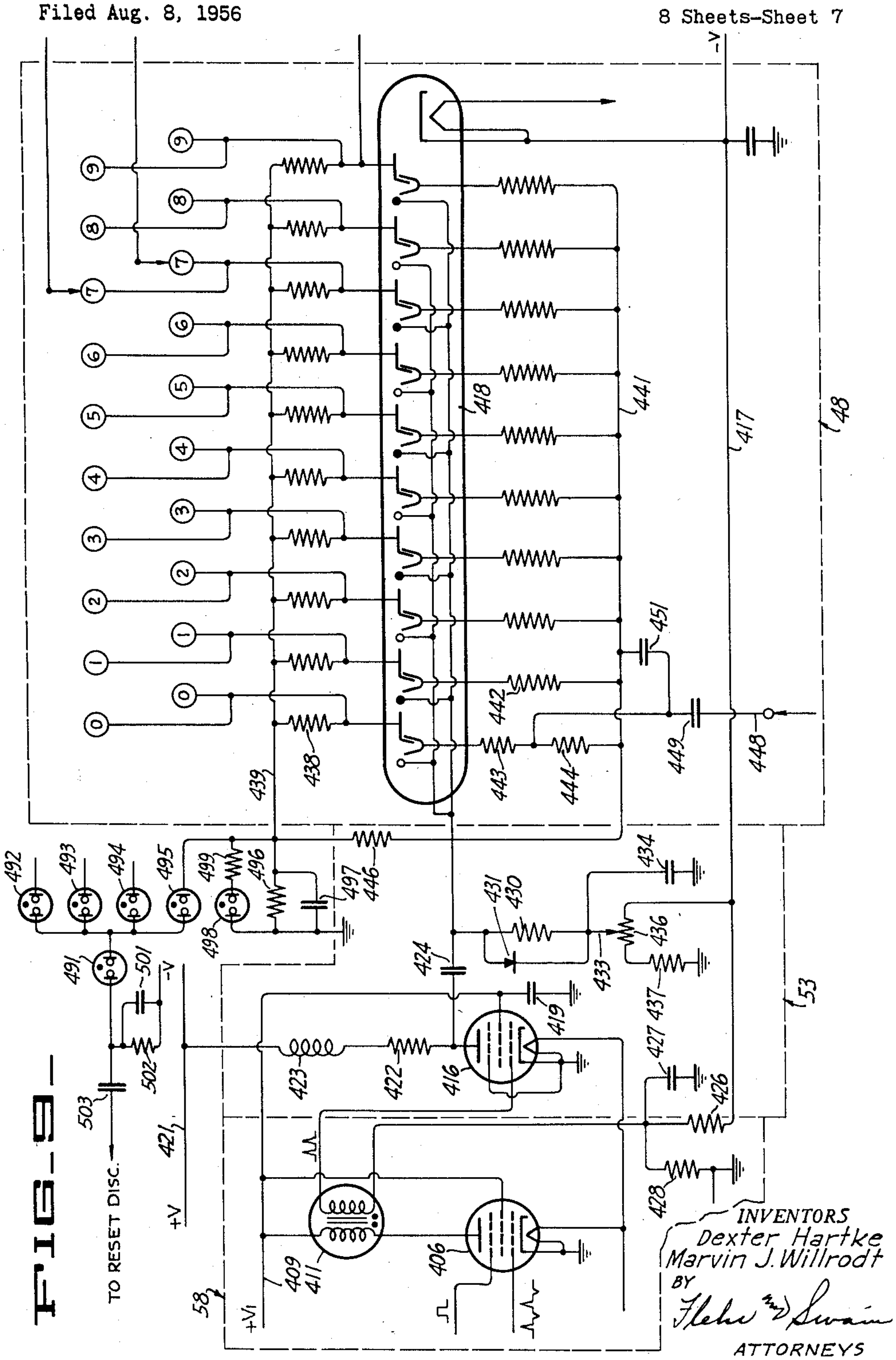
Figure 8:
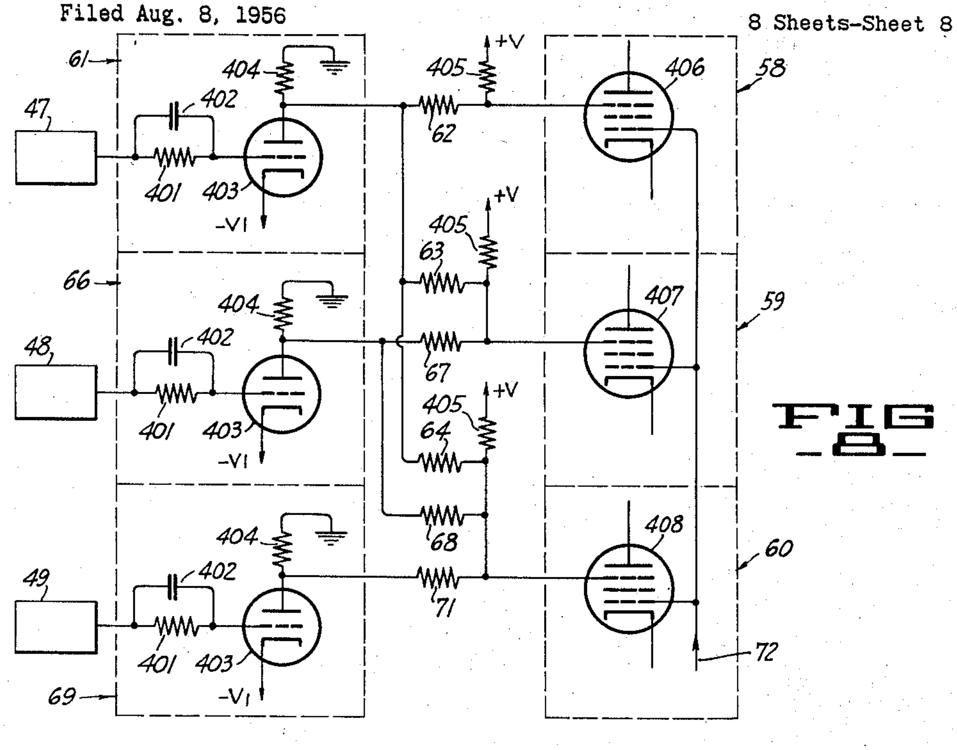

Figures 4A–B show curves which illustrate the operation of the rate generator;

Figures 5A and 5B show a circuit diagram of a pulsed crystal oscillator circuit for generating pulsed sinusoidal oscillations and the currents associated therewith which serve to trigger the same and to form timing pulses;

Figures 6A–K show the wave forms and pulses at various points in the delay generator on a common time scale;

Figure 7 is a circuit diagram showing means for generating pulses which serve to drive the reset circuits;

Figure 8 is a circuit diagram of the gating circuits for the decade counters;

Figure 9 is a circuit diagram showing a decade counter and input gate; and

Figure 10:
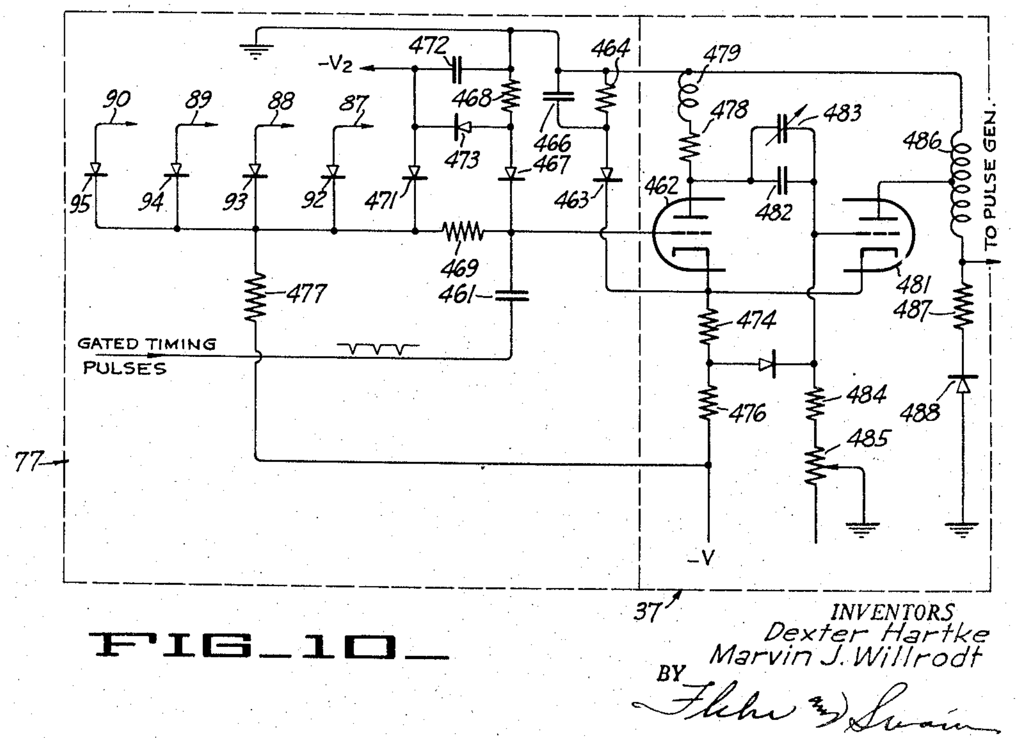

Figure 10 is a circuit diagram showing a pre-set gate.

In terms of broad inclusion, the delay generator comprises a pulsed oscillator which serves to generate a pulsed sinusoidal oscillation. The pulsed sinusoidal oscillation is initiated either by pulses from an external source or from an internal rate generator. An amplitude comparator is connected to receive the pulse oscillations and form an output pulse each time the sine wave reaches a predetermined amplitude. Pre-set counting means are connected to receive the pulses and count the same. When predetermined counts are reached, output pulses are formed at pre-selected times after the occurrence of the initiating event.

Figure 1:
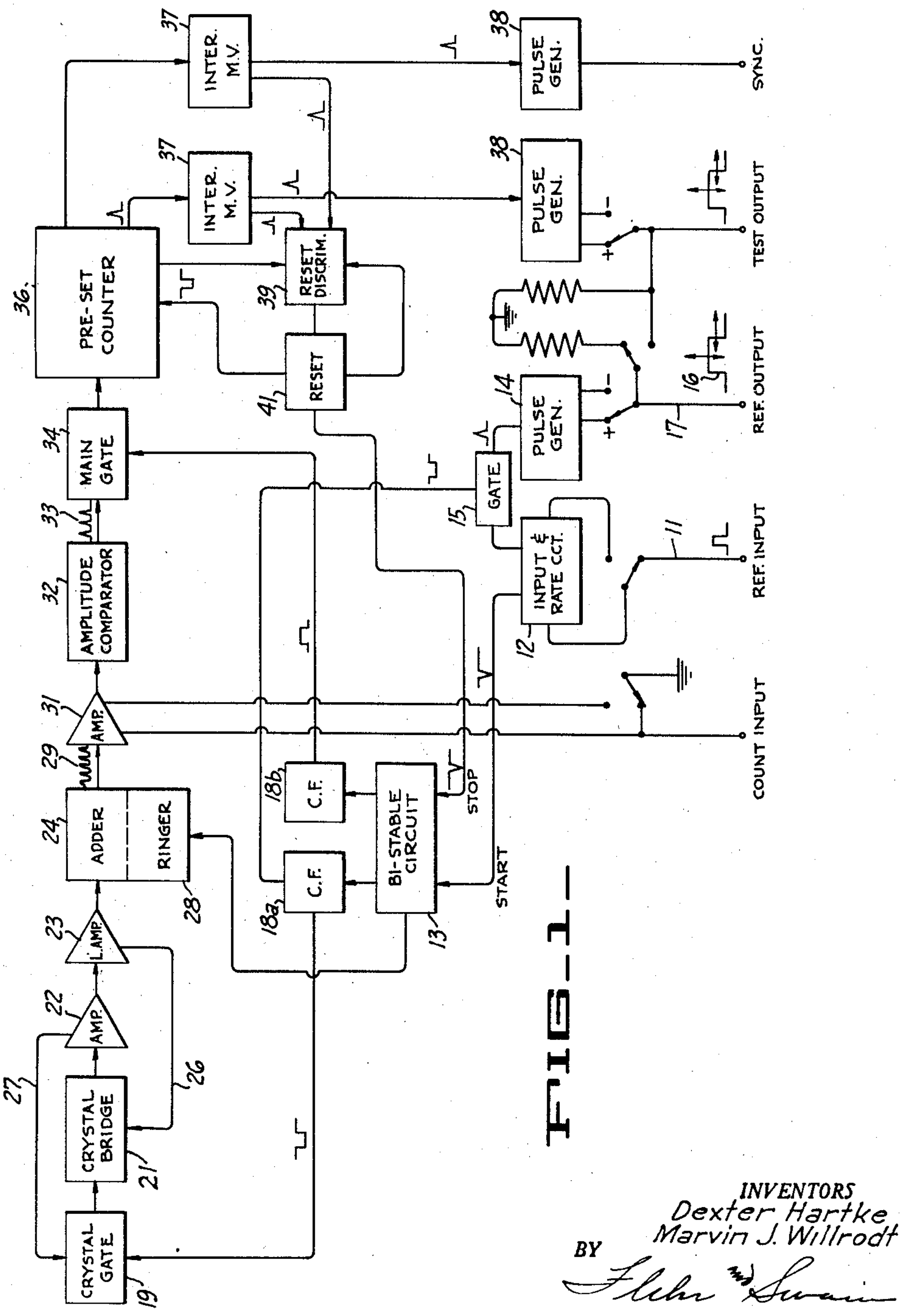
Figure 1 is a block diagram of a delay generator.
Figure 3:
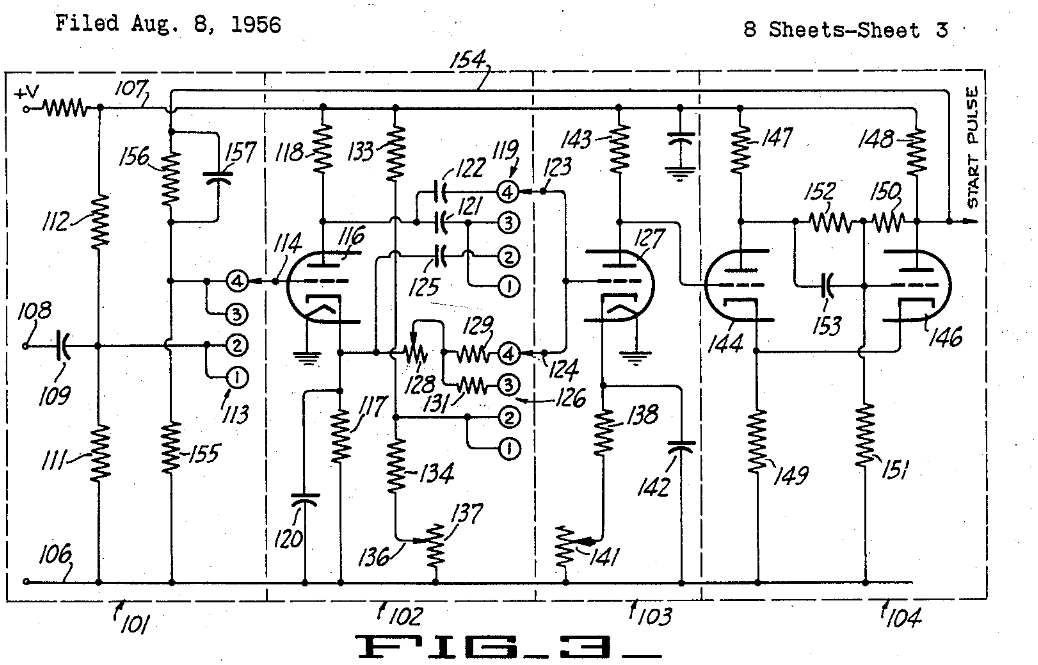
Figure 3 is a circuit diagram of a suitable rate generator.

Referring now to Figure 1, the reference or initiating pulses are applied to the input line 11. The input and rate circuit 12 receives the pulses and forms a triggering pulse which is applied to the bistable circuit 13. The input and rate circuit 12 may comprise a circuit which serves to receive the initiating pulses and to form pulses which are suitable for driving the associated bistable circuit. The circuit may include means for generating pulses at a predetermined rate which are then applied to the bistable circuit 13 to drive the delay generator, as will be presently described. A novel rate generator circuit is shown in Figure 3, and will be presently described in detail.

The pulses generated or formed by the circuit 12 may also be applied to a pulse generator 14 through gate 15. The pulse generator generates a reference output pulse 16 having the desired magnitude, duration and polarity. The output pulse is suitable for application to an oscilloscope or other associated apparatus to give an indication of the start of the time delay interval. The pulse generator might, for example, comprise a blocking oscillator, the output of which triggers a multivibrator. Means may be associated with the input of the multivibrator for controlling the pulse width. The output of the multivibrator may be suitably amplified and means may be provided in the amplifier for controlling the amplitude of the output pulse. Switching means may be connected to the output to control the polarity of the output pulse.

The initiating or starting pulses applied to the bistable circuit 13 serve to switch the circuit into one of its two stable states. An output of the bistable circuit is applied to the cathode follower circuits 18. The output from the cathode follower 18_a_ is applied to the crystal gate 19 which, together with the crystal bridge 21, amplifier 22 and limiting amplifier 23, forms a pulsed crystal oscillator, The output from the cathode follower 18a is also applied to the tube 15 and serves to control the same. This controls the application of pulses to the pulse generator 14 whereby only one reference pulse is formed for each cycle of operation of the generator.

The pulsed crystal oscillator may be one of the type described in volume 11 (Waveforms), pages 145–148 of the Radiation Laboratory Series, McGraw-Hill, 1949. However, for greater accuracy, it is preferred to employ the novel pulsed crystal oscillator circuit shown in Figures 5A and 5B, which will be presently described. The circuit illustrated in Figure 5 serves to generate a pulsed sinusoidal oscillation which is relatively free of distortion during the beginning of a pulse and in which the amplitude remains substantially constant for the duration of the pulse.

The pulse applied from the cathode follower 18a serves to close the crystal gate 19 applying a pulse excitation to the crystal bridge circuit 21 which causes the crystal to oscillate. The output of the bridge 21 is fed to the amplifier 22 which amplifies the pulsed oscillation. The pulsed oscillations are further amplified by the limiting amplifier 23 and applied to an adder 24.

The lines 26 and 27 extending from the amplifiers 22 and 23 to the crystal bridge 21 and gate 19 respectively, serve to provide positive and negative feedback, as will be presently described. Generally, the negative feedback serves to dampen the oscillations upon opening of the gate 19, while the positive feedback serves to maintain the amplitude of the oscillations constant with the gate closed.

An output pulse from the flip-flop circuit 13 is applied to the ringer 28. The ringer 28 oscillates to produce damped oscillations. The circuit may, for example, comprise an inductive-capacitive circuit. The oscillations are applied to the adder 24 where they are added to the amplified oscillations from the bridge 21.

By combining or adding the output of the ringer circuit, which comprises oscillations having appreciable amplitude during the first few cycles with the oscillations from the crystal bridge, which in general are distorted during the first few cycles, it is possible to obtain a pulsed sinusoidal oscillation 29 which is relatively free of distortion. The pulsed sinusoidal oscillations are amplified by the amplifier 31 and fed to an amplitude comparator means 32. The comparator 32 serves to form an output pulse each time the sinusoidal wave reaches a predetermined amplitude. Thus, a burst of timing pulses 33 is formed.

At the same instant that pulses are applied to the gate 19 and ringer 28, a pulse is applied to the main gate 34 which controls application of pulses to the pre-set counter 36. The pulse opens the gate whereby the timing pulses are applied to and counted by the pre-set counter.

The circuit of Figures 5A and 5B, to be presently described, shows a suitable circuit for generating pulsed sinusoidal oscillations, forming timing pulses and gating the same to the pre-set counter. The circuit includes a bistable circuit 13, cathode followers 18, crystal gate 19, bridge 21, amplifier 22, limiting amplifier 23, adder 24, ringer 28, amplifier 31, comparator 32 and main gate 34.

The pre-set counter 36 comprises a plurality of electronic counters adapted to be pre-set to a plurality of counters. The counter counts the input pulses and forms an output pulse each time a pre-set count is reached. By pre-setting the counter a predetermined time will elapse between the application of an initiating pulse to the oscillator circuit and the formation of an output pulse.

The output of the pre-set counter is applied to one or more interpolation multivibrators 37 and thence to pulse generators 38 of the type previously described. The generators serve to form pulses having the desired duration, amplitude and polarity for application to associated circuits. The interpolation multivibrators include time delay circuits whereby the output pulse from the pre-set counter may be delayed a predetermined period of time. Thus, the minimum digital delay increment obtainable by the pre-set counters may be interpolated, as will be presently described.

Pulses from the interpolation multivibrators are also applied to a discriminator circuit 39 which serves to generate a pulse which operates a reset circuit 41 when the last pulse is formed by the pre-set counter. The reset circuit provides an output pulse which resets the pre-set counter 36, the discriminator 39 and the bistable circuit 13. Suitable circuits are shown in Figure 7 and will be presently described in detail.

Figure 2:
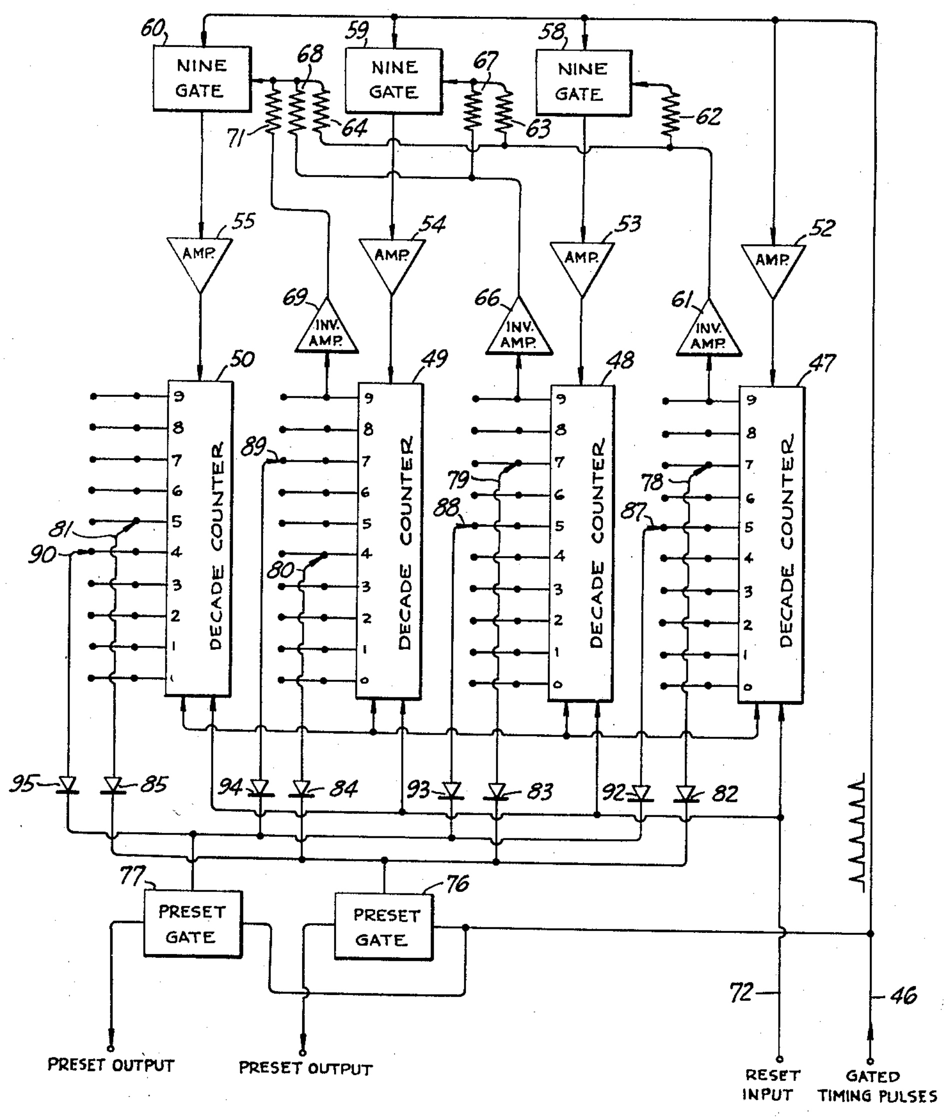
Figure 2 is a block diagram of a pre-set counter.

Referring now to Figure 2 where a block diagram of the pre-set counter is shown, the gated timing pulses are applied to the line 46. A plurality of electronic decade counters 47–50 are connected to receive the gated pulses in parallel. Pulse amplifiers 52–55 are associated with the counters 47–50 respectively and serve to amplify the input pulse whereby the pulse amplitude is suitable for operating the associated counter. The pulsed input is applied directly from the input line 46 to the counter 47 which serves to count units. The input to the counters which count tens, hundreds, thousands, etc. is applied thereto through suitable gates. Thus, gates 58, 59 and 60 are associated with the counters 48, 49 and 50, respectively. A voltage for opening the gate 58 is obtained when the decade counter 47 is at the nine count. The voltage is amplified by the inverter amplifier 61 and applied through the resistor 62 to open the gate. The amplified voltage from the nine count of the units counter is also applied to the gates 59 and 60 through the resistors 63 and 64, respectively. A voltage from the nine count of the tens counter is amplified by amplifier 66 and applied to the gates 59 and 60 through the resistors 67 and 68 respectively. The gate 59 opens only when voltages are applied from the nine count of the counters 47 and 48 simultaneously. A voltage from the nine count of the hundreds decade counter 49 is amplified by the amplifier 69 and applied through the resistor 71 to the gate 60. The gate 60 is opened only when the units, tens and hundreds counters are simultaneously on the nine count. Operation of the parallel input circuit to the decade counters will be presently described.

The pulse from the reset circuit 41 is applied along the line 72 to the plurality of decade counters.

Pre-set gates 76 and 77 are connected to receive the gated timing pulses on line 46 whereby they serve to gate timing pulses. Each of the pre-set gates is connected through diodes to switches which are adapted to make a connection to predetermined terminals of pre-set counters whereby a given count may be pre-set. Thus, the pre-set gate 76 is connected to the switches 78–81 associated with the counters 47–50 through the diodes 82–85 respectively. The pre-set gate 77 is connected to the switches 87–90 respectively through the diodes 92–95 respectively.

The pre-set gates 76 and 77 serve to gate a timing pulse when the count corresponding to the setting of the switches associated therewith is reached. Thus, as shown, the pre-set gate 76 will open when the count is 5,477 and the pre-set gate 77 will open when the count is 4,755. When the pre-set gate opens the next timing pulse will pass therethrough as the pre-set output pulse which is applied to the associated interpolation multivibrator. In general, as will be presently described, it is desirable, for greater accuracy and freedom from jitter, to arrange the switches 78 and 87 whereby the associated preset gates are opened one count before the desired pre-set output pulse is to be passed whereby the next timing pulse is passed by the associated pre-set gate and applied to the interpolation multivibrator.

As previously described, the interpolation multivibrator is capable of introducing a predetermined delay between the reception of an input pulse and the formation of an output pulse. The interpolation multivibrators 37 (Figure 1) may therefore be employed to interpolate between the digital steps that may be pre-set on the decade counter. Depending upon the type of delay circuit employed, it may be possible to subdivide the delay as much as desired.

As previously described, prior art delay generators employing counter circuits have the disadvantage that they must be set to the complement of the number of desired counts when the switching time is an appreciable fraction of the delay increment. As a result, output pulses could be generated only when the counters all reached their maximum count. In the present circuit, the count may be set directly and thus a plurality of output pulses may be obtained. This is of great advantage in certain applications, as for example, where it is desired to synchronize the sweep of a scope with the formation of a pulse which is to be observed. In such an instance, one of the pre-set output pulses may be employed to start the sweep whereby the other pulse may be viewed on the screen. This permits expansion of the horizontal scale of the scope. The count may be set directly because of the novel manner in which the timing pulses are applied to the counters. If the instant invention employed cascaded counters, the delay could not be set accurately, since for certain counts more time would elapse between the application of the desired pulse and the formation of an output pulse as would for other counts. For example, if the pre-set count were 50, then the only delay encountered in the generation of an output pulse would be that required to advance the count from 49 to 50. Whereas, if the pre-set count were 5,000 there would be a substantial delay wherein the units, tens and hundreds counters would advance from the position 9 sequentially until the thousands counters is advanced from the position 4 to 5.

The parallel connection of the decade counters with the gates 58–60 provides means whereby a delay much less than one microsecond is encountered and the delay is constant. The resistive networks associated with each of the gates and connected through the inverter amplifiers to the nine position of the decade counters serves to control the opening of the gates as follows: When the count on the unit counter 47 reaches nine, the inverter amplifier applies a voltage to the resistors 62, 63 and 64, thereby opening the gate 58. The next pulse along the line 46 then serves to simultaneously advance the unit counter from nine to zero and to advance the tens counter 48 through one count. Unless the tens counter is also at the nine count, the gate 59 will remain closed. When both of the units and tens counters are at the nine count, the gate 59 will open whereby the next pulse will simultaneously advance the associated counter 49 as well as the counters 47 and 48 through one count. Operation of the gate 60 is similar whereby the gate is opened when the units, tens and hundreds counters are coincident on the nine count. The next pulse then serves to advance the thousands counter through one count while the hundreds, tens and units counters are also advanced through one count from nine to zero.

As previously described, the delay introduced by the decade counters is much less than one microsecond and constant regardless of the number of decades that must be operated to obtain the pre-set delay. This enables the pre-set gate 76 or 77 to be opened in sufficient time to gate or pass the next timing pulse on line 46 (Figure 2). Thus the pulse gated by the pre-set gate does not suffer any delay.

The input and rate circuit 12 is shown in Figure 3. Briefly, the circuit comprises an input circuit 101, a split load phase inverter 102, an amplifier 103 and a bistable circuit. The plate voltage for the various tubes is applied between the lines 106 and 107. As illustrated, the line 106 is grounded and a plus voltage (+V) is applied to the line 107. The reference input is applied between the line 106 and the terminal 108. The terminal is capacitively connected by capacitor 109 to the resistive divider comprising resistors 111 and 112 connected across the lines 106 and 107. The common junction of the resistors is connected to the terminals 1 and 2 of the switch 113.

The contactor 114 of the switch is connected to the control grid of the triode 116. The cathode is connected to line 106 through cathode resistor 117 and bypass capacitor 120. The plate is connected to the line 107 through the plate resistor 118.

A resistive-capacitive timing network is connected between the plate and cathode of the tube 116. The plate is connected through a capacitor 121 to the terminal 3 of the switch 119 and through a capacitor 122 to the terminal 4. The terminal 1 is connected to the terminal 3 and the terminal 2 is connected to the cathode through a capacitor 125. The contactor 123 is connected to the contactor 124 of the switch 126. The contactor 124 is also connected to the control grid of the tube 127. The cathode of the tube 116 is resistively connected to the terminals 3 and 4. Thus, the series resistors 128 and 129 connect the cathode to the terminal 4, while the series resistors 128 and 131 connect the cathode to terminal 3. The switches 113, 119 and 126 are ganged whereby the contactors 114, 122 and 124 move in unison between the contacts 1–4. The contact 2 of the switch 119 is connected to the cathode of the tube 116 through capacitor 125, and the contact 1 is connected to the plate thereof through capacitor 121. The contacts 1 and 2 of the switch 126 are connected to the common terminal of the resistors 133 and 134. The resistor 133 has its other end connected to the line 107, while the resistor 134 has its other end connected to the variable tap 136 of the potentiometer 137.

The cathode of the tube 127 is resistively connected to the line 106. The resistor 138 is connected in series with the potentiometer 141 to the lead 106. The potentiometer 141 provides means for controlling the square wave symmetry. The capacitor 142 is shunted across the cathode resistors. The plate of the tube is connected to the lead 107 through the plate resistor 143. The tube 127 acts as an amplifier to amplify the signal appearing on the grid and serving to apply the same to the grid of the tube 144.

The tubes 144 and 146 form a comparator circuit which switches when the voltage applied to the grid of tube 144 reaches a predetermined value. The plates of the tubes are connected to the line 107 through the plate resistors 147 and 148. The cathodes are connected together to the line 106 through the cathode resistor 149. The grid of the tube 146 is connected to the plate through resistor 150 and to the line 106 through the resistor 151. The grid is also connected to the plate of the tube 144 through the parallel combination of the resistor 152 and capacitor 153. The output from the comparator circuit is obtained at the plate of the tube 146. The output from the comparator circuit is fed back to the grid of the tube 116 along line 154 when the switch is in the positions 3 and 4. The series combination of resistor 155 and the parallel circuit comprising resistor 156 and capacitor 157 is connected between the line 154 and the line 106. The common junction of the resistors 155 and 156 is connected directly to the terminals 3 and 4 of the switch 113 and may be connected to apply the signal to the grid of the tube 116.

When external pulses are being applied, the circuit merely serves to amplify the pulses for application to the comparator or trigger circuit 104 which then forms suitable output pulses for application to the bisstable circuit 13 (Figure 1). The switch positions 1 and 2 of switch 113 are both connected to the input line. Similarly, the switch positions 1 and 2 of the switch 126 are connected to the junction of the resistors 133 and 134 in order to supply the tube 127 with the proper operating grid bias voltage. However, the positions 1 and 2 of the switch 119 connect to the plate and cathode, respectively. In the position 1 it is desirable to have the circuit respond to pulses having a negative polarity, while in the position 2, it is desirable to have the circuit respond to pulses having positive polarity. However, by adjustment of potentiometer 137, the response may be reversed.

The circuit may operate as a generator capable of generating pulses at any desired number of rates. The generator shown serves to generate pulses at two different rates depending upon whether the switch is in position 3 or 4. The rate is given by:

$$f=\frac{1}{kRC}$$

where:

$f$=frequency or rate
$k$=constant which is dependent upon circuit components
$R$=resistance in timing circuit
$C$=capacitance in timing circuit By proper selection of circuit constants, the rates may be decades of one another. Since the operation in either position is the same except for the circuit constants employed, the operation of the circuit with the switch in position 4 will be described. The output pulses which are represented in Figure 4A are fed back to the grid of the amplifier tube 116. The pulse voltage which appears across the tube 116 also appears across capacitor 122 and resistors 129 and 128. Referring now to Figure 4B, the voltage appearing at the grid of the amplifier tube 127 will be substantially as shown by the solid curve 161. The voltage reaches a maximum 162 and then decays to a point 163. At this point, the comparator is switched. The voltage is then represented by 164. The voltage again decays to the point 166 at which time the circuit is again switched. The voltage region between the level 163 and 166 represents the hysteresis of the comparator, which can be reduced to zero by proper selection of R150.

If the line voltage applied between the lines 106 and 107 varies, then the dotted curve represents the voltages appearing at the grid of tube 127. It is seen that the comparator will be switched at the same time to form pulses at a constant frequency. That the frequency does not depend upon voltage is apparent from the equation (above) giving the rate or frequency $f$.

Thus it is seen that a novel circuit has been provided which serves to form output pulses in response to reference inputs and which also may be switched to generate rate pulses at a substantially constant frequency. Variations in plate voltage do not appreciably affect the frequency of operation.

Referring now to Figures 5A and 5B, the various circuits which are employed to generate the gated timing pulses are shown in detail. The reference numerals which are applied to the blocks in dotted outline correspond to the numerals in the block diagram of Figure 1.

The tubes 171 and 172 are connected in a conventional manner to form a bistable circuit. The cathodes of the tubes are connected together and to the line 173 through the parallel combination of capacitor 174 and resistor 176. The plate of the tube 172 is connected to the grid of the tube 171 through the capacitor 177. The plate of the tube 171 is connected to the grid of the tube 172 through the capacitor 178. The plate of the tube 172 is also connected to the line 173 through the series combination of resistors 179 and 181. The common junction of these resistors is likewise connected to the grid of the tube 171. Similarly, the plate of the tube 172 is connected to the line 173 through the series combination of resistors 182 and 183. The common junction is connected to the grid of the tube 172. The grid of the tube 171 is connected to the stop terminal 184 through the series combination of diode 186 and capacitor 187. The diode 186 serves to pass pulses having a predetermined magnitude and polarity to switch the circuit into one of its two operating conditions. The terminal 188 is adapted to receive starting pulses.

The grid of the tube 172 is connected to the start terminal 188 through the series combination of diodes 189 and capacitor 191. Here again, the diode 189 serves to pass pulses having a predetermined amplitude and polarity to the grid of the tube 172 whereby the bistable circuit is switched into its other stable state.

The cathodes of the tubes 171 and 172 are connected to the common junctions of the diode 186 and capacitor 187 and the common junction of diode 189 and capacitor 191 through the resistors 192 and 193, respectively. The plate of the tube 172 is connected to ground through the series combination of resistors 194 and 195 and inductance 196. The plate of the tube 171 is connected to ground through the series combination of resistors 197 and 198 and the inductance 199.

The plate of the tube 172 is connected to the control grid of the tube 201, connected to operate as a cathode follower. The plate of the tube 201 is connected to a voltage supply $+V_1$ and the cathode is connected to the voltage supply $-V$ through the resistor 202. The output from the cathode follower is applied to the gate 34 (Figure 1) which controls the application of timing pulses to the counters. The cathode of tube 201 is connected to ground through a diode 203 to clamp its positive swing to ground.

A tube 204 is connected to operate as a cathode follower between the $+V_1$ and $-V$. The plate of the tube is directly connected to $+V_1$. The cathode is connected to the $-V$ line through the resistor 206. The output is applied through a delay line 214 to the crystal oscillator gate 19 (Figure 1) to be presently described.

The plate of the tube 171 is connected to the plus voltage line through the series resistors 207 and 208. The common terminal of the resistors is grounded through diode 209 and is connected to the $-V$ supply through diode 211. The common junction of the diodes 209 and 211 and resistors 207 and 208 is connected to the grid of the ringer circuit control tubes, to be presently described.

Figure 6:
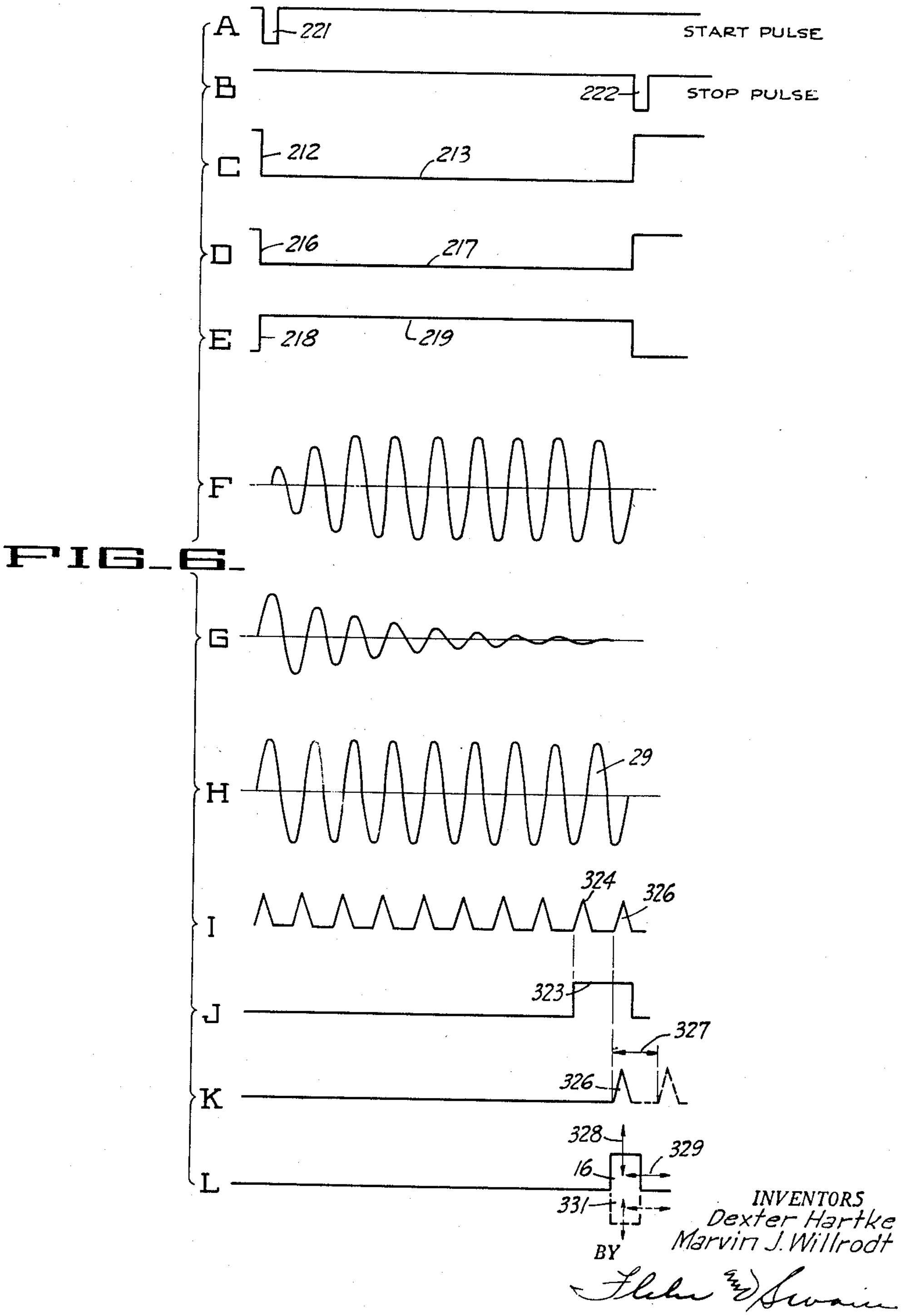

Upon application of a start pulse 221 to the circuit 13 the leading edge 212 of the pulse 213 is formed and the pulse is applied to the delay line 214. Simultaneously, the leading edge 216 of the pulse 217 and the leading edge 218 of the pulse 219 are formed. These various pulses are shown in the timing diagram, Figure 6. Thus, a start pulse 221 is shown in Figure 6A, the pulse 213 with the leading edge 212 is shown in Figure 6C, the pulse 217 with the leading edge 216 is shown in Figure 6D, and the pulse 219 with the leading edge 218 is shown in Figure 6E. Application of a stop pulse 222 derived from the preset counter to the terminal 184 switches the circuit whereby the pulses are terminated. Thus, referring to Figure 6B, when the stop pulse 222 is applied, the pulses 213, 217 and 219 are terminated as indicated. The duration of the pulse formed by the bistable circuit is dependent upon the delay between application of a start pulse to the terminal 188 and a stop pulse to the terminal 184.

The output pulse 213 from the cathode follower 18a is applied to the delay line 214. The delay line serves to delay the application of a pulse to the suppressor grid of the pentode 226 connected to act as a gate. The suppressor grid is connected to ground through the limiting diode 227 whereby the positive excursions of the grid are limited. The screen grid is connected to the common terminal of the resistor 228 and resistor 229 which are connected between the line 231 and ground. A capacitor 230 is connected in parallel with the resistor 229. The cathode of the tube 226 is connected to ground through resistor 232. The plate circuit is connected to the crystal bridge, to be presently described. The circuit constants of the gate are chosen such that the tube 226 is normally conducting plate current and is switched into a non-conducting condition upon the application of the negative pulse 213 to the suppressor grid.

The plate of the tube 226 is connected to the crystal bridge. The center tapped inductor 234 forms two legs of the bridge. Series capacitors 235 and 236 are connected in shunt with the inductor 234. The center tap of the inductor 234 and the common junction of the capacitors 235 and 236 are connected to the line 231. A variable capacitor 237 is connected in another leg and the crystal 238 is connected in series with a parallel combination of capacitor 239 and variable capacitor 241 in the fourth leg of the bridge and act as trimming capacitors. The adjustable inductance 234 provides means whereby the bridge may be tuned. The bridge circuit allows the voltage pulse applied to the bridge when the tube 226 is cut off to excite the crystal 238 without having the pulse appear at the bridge output. For the pulse to be completely eliminated, the bridge should be balanced at all frequencies contained in the pulse. This condition can only be achieved by using identical crystals in two branches of the bridge. This is no solution, for both of the crystals would then be excited by the pulses and their output would cancel.

However, at frequencies other than the natural frequency of vibration, the crystal appears as a fixed capacitor. Therefore, bridge balance may be obtained by means of the capacitor 237. The crystal frequencies and frequencies which are near the crystal frequency are not balanced out. The latter cause some distortion at the beginning of the pulse. The duration of this distortion is a few cycles. A circuit will be presently described which serves to compensate for this distortion. The crystal frequency appears at the bridge output as a sinusoidal oscillation.

The pulsed sinusoidal oscillations from the bridge circuit are applied to the control grid of the tube 242. Thus, the bridge is connected to resistor 244 and to the control grid of the tube 242. The suppressor grid is connected directly to the line 173. The screen grid is connected to the common terminal of the resistor 246 and capacitor 247 which are connected across the lines 173 and 231. The cathode is connected to line 173 through the parallel combination of bias resistor 243 and bypass capacitor 245.

A tuned or resonant circuit 248 which includes capacitor 249 and the adjustable inductor 251 is connected in the plate circuit. The circuit is tuned to a somewhat lower frequency than the frequency of the pulsed sinusoidal oscillation to provide the proper phase for the negative feedback. The resistor 252 is connected in parallel with the tuned circuit.

The control grid of the tube 226 is coupled to the plate of the amplifier 242 through the lead 27 and serves to provide a negative feedback signal to the tube 226 whereby when the tube becomes conducting, the negative feedback is amplified and applied to the crystal bridge to damp out the oscillations in the bridge. The coupling network comprises the series combination of capacitor 253 and resistor 254 connected to ground and having their common terminal connected to the control grid of tube 226.

The output from the amplifier 242 is applied to the control grid of the tube 261. The plate of the tube 242 is connected to the line 173 through the series combination of the capacitor 262 and resistor 263. The common terminal of the capacitor and resistor is connected to the control grid. The suppressor grid of tube 261 is connected to the line 173 and the screen grid is connected to the common terminal of the resistor 264 and capacitor 266 which are connected across the lines 173 and 231. The plate of the tube is connected to the variable inductor load 267 which has its other terminal connected to the line 231. The cathode is connected to the line 173 through the bias resistor **265*a* and bypass capacitor 265*b***.

An amplitude limiting circuit is associated with the tube 261 and serves to limit the amplified signal. The circuit comprises a voltage divider circuit comprising serially connected resistors 268 and 269 connected between the lines 173 and 231. A limiting diode 271 is connected between the plate and the common terminal of the resistors 268 and 269.

A fraction of the amplified and limited signal appearing in the plate circuit of tube 261 is fed back to the crystal bridge as a positive feedback signal. The signal is obtained at the common terminal of the serially connected capacitors 272 and 273 which are connected in parallel with the inductor 267. The feedback serves to maintain the amplitude of the oscillations constant.

The output of the limiting amplifier 23 is applied to the grid of the tube 274 which forms part of the amplifier 31. The grid of the tube 274 is connected through the capacitor 275 to the common terminal of the series capacitors 276 and 277 which are connected between the plate of the tube 261 and the lead 173. Variable inductance 278 is connected between the grid of tube 274 and the lead 173. A pair of triodes 279 and 280 are connected in parallel between the grid of the tube 274 and the line 231. The plates of the tubes are connected together and to line 231. The cathodes of the tubes are connected to the grid of tube 274 through the parallel combination of the resistor **281*a*, and capacitor 281*b*. The output pulse 217 is applied to the grid of the tubes 279 and 280 which are interconnected by the resistor 282. The tubes 279 and 280 are biased whereby they are normally conducting. When the pulse 217 is applied, the tubes are abruptly cut off. This excites the circuit which comprises capacitors 275 and 277 and the inductor 278** which causes the circuit to ring to generate damped sinusoidal oscillations.

Referring to Figure 6, the amplified oscillations from the crystal oscillator which appear at the junction of 278 and 281 are shown in Figure 6F having the first few cycles distorted and increasing in amplitude and maintaining a constant amplitude throughout the remainder of the pulse. The oscillations of the ringer circuit will be of the form shown in Figure 6G wherein the oscillations during the beginning of the pulses have a large amplitude and rapidly decay with time. By properly adjusting the phase of the amplified oscillations from the crystal oscillator and the decaying oscillations from the ringer circuit, it is possible to obtain a wave of the type shown in Figure 6H wherein the wave starts at zero upon the application of a start pulse to the bistable circuit and maintains a constant amplitude throughout the pulsed oscillation. The importance of the delay line 214 is now apparent. By adjusting the delay line, the application of the pulse which sets up oscillations in the bridge circuit may be delayed whereby the pulsed crystal oscillations and the decaying ringer oscillations may be added to give the desired pulse sinusoidal oscillations shown in Figure 6H and at 29 in Figures 6 and 1 respectively. It is, of course apparent that the desired delay may be introduced anywhere in the circuit.

The pulsed sinusoidal oscillations are applied to the grid of the tube 274. The cathode of the tube 274 is connected to −V″ through the resistor 282. The plate of the tube is directly connected to the line 231. The tube 274 functions as a cathode follower. The cathode of the tube 283 is directly connected to the cathode of the tube 274. The plate is connected to the line 231 through resistor 284. The grid of the tube 283 is connected to the line 173. Provision is made for connecting an external count input to the grid (285).

The output from the tube 283 is capacitively coupled 286 to the common terminal of the series resistors 287 and 288 which is connected to the grid of tube 291. A variable resistor 289 is connected in series with these resistors all connected across the lines 173 and 231 to adjust the grid of tube 291 to the proper trigger level.

The tubes 291 and 292 are connected to act as an amplitude comparator circuit which generates a pulse each time the pulsed sinusoidal oscillations reach a predetermined amplitude. In the circuit shown the cathodes of the tubes 291 and 292 are connected together and to the lead 173 through the resistor 293. The plate of the tube 291 is connected to the line 231 through the parallel combination of inductor 294 and resistor 295 and the series resistor 296. The plate of the tube 292 is connected to the line 231 through the primary of the transformer 297. The grid of the tube 292 is connected to the line 173 through the resistor 298. The grid is also connected to the plate of tube 291 through the parallel combination of resistor 299 and capacitor 300. The secondary of the transformer 297 is connected in parallel with the series combination of resistor 301 and diode 302 which prevent ringing of the transformer 297.

One terminal of the transformer is connected to the control grid of the gate tube 303 and the other terminal is connected to the line 304 which forms part of a bias network to be presently described. The screen grid of the tube 303 is connected to the common terminals of the resistors 306 and 307 which are connected across the lines 173 and 231. The screen grid is connected by capacitor 308 to the cathode. The cathode is directly connected to the line 173. The plate of the tube 303 is connected to the line 231 through the primary of the transformer 309. The secondary of the transformer is connected in parallel with the series combination of resistor 311 nad diode 312. One side of the transformer secondary is connected to the input of the pre-set counter circuit. The other terminal of the secondary is connected to a bias network line 305. The suppressor grid of the tube 303 is connected to receive a pulse 219 from the cathode follower 18*b* of the flip-flop circuit. The positive pulse applied thereto serves to open the gate whereby the pulses generated by the comparator circuit are applied to the pre-set counter.

The bias circuit comprises resistors 313 and capacitors 314 connected between the line 304 and the line 173. A resistor 316 has one end connected to the line 304 and its other end connected to the line 305. The capacitor 317 is connected between the line 305 and the resistor 319 which has its free terminal connected to —V. The other terminal of the resistor 319 is also connected to the line 173 through the capacitor 321.

Referring again to Figure 6H, the pulsed sinusoidal oscillations 29 are applied to the amplitude comparator circuit which serves to produce a plurality of timing pulses of the type shown in Figure 6I. These pulses are applied to the preset counter and are counted. As previously described, the pre-set counter is set whereby the pre-set gates are opened one count before the desired output pulse is to be generated. Thus, in Figure 6J, the voltage pulse which serves to open the pre-set gate 71 or 76, as the case may be, is shown at 323. The leading edge of the pulse corresponds to the timing pulse 324. The pulse 323 opens the pre-set gate whereby the next timing pulse 326 is passed thereby and applied to the interpolation circuits. The interpolation circuits provide means for delaying the pulse 326 a time which corresponds to the arrow 327 which corresponds to the time between adjacent timing pulses. The pulse from the interpolation oscillator is then applied to the pulse generator. The pulse generator forms a pulse 16 having adjustable width, amplitude and polarity as indicated by the arrows 328 and 329 and the dotted outline 331. The forward edge of the output pulse 16 will coincide with the front edge of the pulse 326 which is generated by the interpolation oscillator.

The discriminator circuit which receives the output pulses from the interpolation multivibrators and forms the control pulse for the reset circuit 41 is shown in Figure 7. The circuit comprises a bistable circuit associated with each of the multivibrators and interconnected to form a control pulse when the last gated timing pulse is passed to the pre-set gates. The circuit illustrated comprises a pair of bistable circuits 39 which serve to control a blocking oscillator 41 which forms the reset pulse.

The plates of the tubes of the bistable circuit are connected to the line 340 and the cathodes to the line 341. The tubes 342 and 343 form one bistable circuit, while the tubes 344 and 346 form the other bistable circuit. The plates of the tubes 342 and 346 are connected by the resistors 347 and 348 to one side of the clamping diode 349. The other side of the clamping diode is connected to the line 340. A capacitor 350 is connected in parallel with the diode 349. The plates of the tubes 343 and 344 are interconnected and are connected to the line 340 through the clamping diode 351. The clamping diodes serve to prevent the plate voltage of the tubes 343 and 344 from falling below that of the line 340. The cathodes of the tubes 342 and 343 are interconnected and connected to the line 341 through the resistor 352. The plate of the tube 342 is connected to the grid of the tube 343 through the parallel network of capacitor 354 and resistor 356. The grid is also connected to the line 341 through the resistor 357 and to the line 340 through capacitor 358. Similarly, the plate of the tube 346 is connected to the grid of the tube 344 through the parallel combination of capacitor 359 and resistor 361. The grid is also connected to the line 341 through the resistor 362 and to the line 340 through capacitor 363.

The input signals from the interpolation multivibrators are applied along the lines 364 and 366 to the grids of the tubes 342 and 346 respectively.

The input signal is coupled to the grids through the coupling capacitors 367 and 368, respectively, connected to the resistors 369 and 371 which are connected in series with the grids of the respective tubes 342 and 346. The voltage divider network comprising resistors 372 and 373 is connected between the lines 340 and 341. The common terminal of the resistors 372, 373 is connected to the common terminal of the capacitor 367 and resistor 369.

Similarly, a voltage divider network comprising resistors 374 and 376 is connected between the lines 340 and 341 with the common terminal of the resistors connected to the common terminal of the capacitor 368 and resistor 371.

Upon application of a positive pulse, the respective tube 342 or 346 becomes conducting cutting off the associated tube 343 or 344. When the tubes 343 and 344 are both cut off, the plate voltage rises above the voltage of the line 340 to which it was previously clamped by the diode 351.

The plates of the tubes 343 and 344 are connected to the line 377 through the series combination of resistors 378 and 379. The common junction of the resistors 378, 379 is coupled to the grid of tube 381 through the parallel combination of resistor 382 and capacitor 383. The grid of tube 371 is also connected to line 341 by resistor 380. The plate of tube 381 is connected to the plate of tube 384. The cathode of the tube 381 is connected to the junction of resistors 386 and 387 which are connected across the lines 340, 341.

The common terminal of the resistors 347 and 348 and the diode 349 is connected to the plate of tubes 381, 384 through the capacitor 388 connected in series with the parallel combination of diode 389 and resistor 391.

The cathode of the tube 384 is connected directly to the line 340, while the plate is connected to the line 377 through the parallel combination of diode 392, resistor 393 and the primary of transformer 394. The secondary of the transformer has one side connected to the grid of the tube 384 through resistor 397 and its other side connected to the common junction of the resistor 386 and 387, which are connected between lines 340 and 341. The primary of the transformer is connected to ground through a capacitor 398. The circuit including the tube 384 acts as a blocking oscillator to form output pulses which serve to reset the counters, switch each of the bistable circuits of the discriminator whereby tubes 342 and 346 are cut off, and switch the bistable circuit 13 (stop pulse).

Operation of the circuits 39 and 41 to form reset pulses in response to output pulses from the pre-set counters is as follows: When the first positive pulse is applied to either the grid of the tube 342 or 346, the tube begins to conduct, thereby cutting off the associated tube 343 or 344. Assume, for example, the tube 342 is switched into a conducting condition and that the tube 343 is made non-conducting. The plate voltage of the tube 343 will attempt to rise. However, the plate voltage of the associated tube 344 is below the voltage of the line 340 because that tube is conducting and therefore the voltage on the grid of the tube 381 is still maintained negative. However, when the next pulse is applied, it will switch the tube 346 into a conducting condition and the tube 344 will be switched into a non-conducting condition. The plate voltage will rise to a voltage above that of the line 340 since the clamping diode can only maintain the voltage up to this level. This causes the tube 381 to become conducting. When the tube 381 becomes conducting, the plate voltage is lowered. The plate of the tube 384 is also lowered since the two plates are interconnected. A pulse is formed on the primary of the transformer 394 and is transferred to the grid of the tube 384 which causes the tube to instantaneously conduct. The large pulse, when the tube becomes conducting, serves to drive the grid whereby the tube becomes non-conducting. The pulse serves to reset the counters, the bistable circuit 13 and reset discriminator 39. The blocking oscillator is in readiness for the next cycle of operation.

The inverting amplifiers 61, 66 and 69 and resistive networks associated therewith are shown in Figure 8. The blocks 47, 48 and 49 represent the units, tens, hundreds decade counters. The inverting amplifiers are shown in dotted blocks 61, 66 and 69, and the nine gates are schematically shown in the dotted blocks 58, 59 and 60. A suitable gate circuit is shown in detail in Figure 9 and will be presently described.

The inverting amplifiers are connected to the nine terminal of the associated decade counters through the network comprising the parallel combination of resistor 401 and capacitor 402. The signal from the decade counters is applied to the grids of the associated tube 403. The plates of the tubes are connected to a —V voltage supply. The output from the inverting amplifiers is applied to the suppressor grid of the associated gating pentodes 406–408 through the resistive network previously described. Thus, the amplified output from the nine gate of the decade 47 is resistively connected to the suppressor grid of the tubes 406, 407 and 408. The amplified output of the nine gate from the decade 48 is applied to the suppressor grids of the tubes 407 and 408 through the resistors 67 and 68. The amplified output of the nine count of the decade 49 is applied to the suppressor grid of the tube 408 through the resistor 71. The suppressor grid of each of the tubes is connected to a +V supply through resistors 405. As previously described, the gated timing pulses are applied to the control grids of each of the gating tubes 406, 407 and 408. The tube 406 becomes conducting when the associated decade 47 is on the nine count, the tube 407 becomes conductive when the decades 47 and 48 are on the nine count, and the tube 408 becomes conducting when all three decades are on the nine count.

In Figure 9, a circuit diagram of the decade counter 48 with associated amplifier 53 and nine gate 58 is shown. Only one counter is shown since the other counters are similar. The nine gate comprises the tube 406 which has the gated timing pulses from 34 applied to the control grid. The gating signal is applied to the suppressor grid through the resistive network previously described in connection with Figures 2 and 8. The plate of the tube is connected to the line 409 through the primary of the transformer 411. The screen grid of the tube is directly connected to the line 409. One side of the secondary of the transformer 411 is connected to the control grid of the tube 416 and the other side is connected to bias network 426, 427, 428 and —V. The cathodes of the tubes 406 and 416 are grounded. The screen grid of the tube 416 is connected to the line 409 and connected through the capacitor 419 to ground. The plate of the tube 416 is connected to the line 421 through the series combination of resistor 422 and inductor 423. The plate of the tube 416 is connected to the switching grids of the tube 418 through the coupling capacitor 424.

A circuit is connected between the switching grids and cathode of the beam switching tube. The circuit illustrated comprises the resistor 430 connected in parallel with the diode 431. One end of the parallel combination is connected to the switching grids and the other end is connected to the variable tap 433, to the line 417 and to ground through the capacitor 434. The variable tap 433 is associated with the potentiometer 436 which has one end connected to the line 417 and its other end connected to the resistor 437 which has its other end grounded.

The target plates of the tube 418 are each connected through a resistor 438 to the line 439. The target plates are also connected to one terminal of the associated switch. The spade beam forming and locking electrodes are resistively connected to the line 441. The spades corresponding to the one through nine count are all connected to the line 441 through like resistors 442. The spade associated with the zero count is connected to the line 441 through the series combination of resistors 443 and 444. The line 441 is connected to the line 439 through the resistor 446. A negative reset pulse is applied at the line 448. The reset line is capacitively coupled 449 to the common junction of resistors 443 and 444. The common junction is also capacitively connected 451 to the line 441.

Operation of the circuit of Figure 9 is as follows: When the nine gate is opened, a timing pulse is amplified to apply a voltage to the switching grid which advances the count through one count. When the gate is again opened, the count is advanced another count by the timing pulse at its grid. When the count reaches nine, a voltage is applied to the nine gate of the next higher counter which together with other voltages simultaneously applied will open the gate to pass the next count, as previously described.

A pre-set gate and an interpolation monostable multivibrator are shown in Figure 10. The gated timing pulses are capacitively coupled by the capacitor 461 to the grid of the tube 462. The switches 87–90 are shown together with the clamping diodes 92–95, all shown in Figure 2. When the count has reached the pre-set value as determined by the switches 87–90, the diode gate 467–473, to be presently described, opens whereby the next timing pulse (negative) is applied to the grid of tube 462 and serves to switch the multivibrator circuit to form an output pulse after a predetermined time delay. The cathode of the tube 462 is connected to ground through the diode 463 connected in series with the parallel combination of resistor 464 and capacitor 466. The grid of the tube 462 is connected to ground through the series combination of diode 467 and resistor 468. One side of each of the diodes 92–95 is connected to the grid through the resistor 469. The diodes are also connected through the diode 471 to a $-V_2$ voltage supply. The voltage supply $-V_2$ is connected to ground through the capacitor 472. The common terminal of resistor 468 and diode 467 is connected by the diode 473 to $-V_2$. The combination of elements 467–473 form a diode gate. The cathode of the tube 462 is connected to a —V through the series combination of resistors 474 and 476. The common junctions of the diodes 92–95 are connected to a voltage supply —V through resistor 477.

The plate of the tube 462 is connected to ground through the series combination of resistor 478 and inductance 479. The plate is also coupled to the grid of the tube 481 through the parallel combination of capacitor 482 and adjustable capacitor 483. The grid of tube 481 is connected to ground through the resistor 484 and the potentiometer 485 which has its tap grounded. The potentiometer 485 serves to control the delay introduced by the interpolation multivibrator. The cathodes of the tubes 462 and 481 are interconnected. The plate of the tube 481 is connected to a tap on the inductance 486. The indutance 486 has one side connected to ground and its other side connected to ground through the series combination of resistor 487 and diode 488. The pulse output is obtained at the common terminal of the inductor 486 and the resistor 487.

The operation of the circuit is as follows: When the counters reach the predetermined count as set by the switches 87–90 (Figure 2) the diode gate opens. The grid of the tube is unclamped. The next gated timing pulse serves to trigger the multivibrator to form the output pulse at the completion of its operation cycle. The length of time required for this operating cycle is adjusted by 485.

In a delay generator which employs decade counters of the beam switching type illustrated in Figure 9, there are certain conditions under which the beam will not form. Generally, this occurs when the instrument is first energized. However, it is possible to lose the beam as a result of transients in the line voltage.

It is, therefore, necessary to provide means for forming the beam on the target representing the zero position. A manual control may serve to control the voltage applied to the zero spade. When the voltage is lowered, the beam will form and lock in the zero position. However, we prefer to employ a circuit which automatically reforms the beam and locks the same in the zero position.

A suitable circuit which includes a blocking oscillator is shown in Figure 9. The circuit comprises a neon tube 491 connected in series with the parallel combination of neon tubes 492, 493, 494 and 495. The tube 495 has its other end connected to the line 439. The tubes 492–494 are connected to a similar line of the other decade counters. The line 439 is connected to ground through the parallel combination of resistor 496 and capacitor 497. The neon tube 498 connected in series with the resistor 499 is connected across the parallel combination. This tube is lit when the beam is formed in the beam switching tube.

The other end of the neon tube 491 is connected to —V voltage through the parallel combination of capacitor 501 and resistor 502. When the beam is not formed in the beam switching tube, the voltage on the line 439 is raised. The voltage across the series combination of neon tube 491 and the appropriate one of the other tubes is sufficient to cause the relaxation oscillator comprising the pair of neon tubes 495 and 491 and capacitor 501 and resistor 502 to oscillate. The pulses which are formed are applied to the blocking oscillator (Figure 7) through the capacitor 503. These pulses operate the blocking oscillator to form a reset pulse. The reset pulse serves to lower the voltage of the zero spade whereby the beam is formed and locked in the zero position. This pulse also serves to reset the bistable circuit 13 and the discriminator circuit 39, as previously described. When the beam is formed in the beam switching tubes, the voltage at 439 goes to a more negative value. This leaves an insufficient voltage across the neons to operate the same. The relation oscillator stops its oscillations.

Operation of the delay generator, assuming application of an external reference input, is as follows: Application of the reference input pulse to the line 11 causes the input and rate circuit 12 to generate a pulse which is applied to the bistable circuit 13 and to the generator 14 through the gate 15. The circuit 13 switches into one of its two stable conditions. This forms output pulses which are applied to the gate 15, to crystal gate 19, to the main gate 34 and to the ringer 28. The pulse applied to the gate 15 closes the same to prevent the formation of another reference pulse until the circuit 13 is switched back by a pulse from the reset circuit 41. The pulse applied to the gate 19 closes the gate, thereby applying pulsed excitation to the crystal bridge 21. The output of the crystal bridge 21 is applied to the amplifier 22. Positive feedback from the limiting amplifier 23 to the crystal bridge serves to maintain the pulsed crystal sinusoidal oscillation at a constant amplitude. The output of the limiting amplifier 23 is applied to the adder 24. Shortly before application of a pulse to the gate 19, which pulse was delayed by the delay line 214 (Figure 5A), the ringer 28 is set into oscillation. The phase of the pulsed crystal sinusoidal oscillations is adjusted whereby the combined oscillations from the crystal and ringer serve to form a pulsed sinusoidal oscillation which is free of distortion. This pulsed crystal oscillation is amplified by the amplifier 31 and applied to an amplitude comparator 32 which serves to form timing pulses each time the pulsed sinusoidal voltage wave goes through a predetermined amplitude. The output of the amplitude comparator is gated to the pre-set counting circuit 36.

The pre-set counter is set to a count which corresponds to a predetermined delay after the application of the input pulse. When the counter reaches one count before the predetermined count, the pre-set gate is opened whereby the next timing pulse not only advances the counters but is also available at the output as a test pulse. The test pulse will have an accurate time delay from the reference input pulse. The time delay will be accurate within the accuracy of the crystal. The pulse is applied to interpolation multivibrators which serve to provide means for interpolating between the digital steps obtainable on the counter.

As previously described, the count may be pre-set directly to a plurality of counts since the component counters are connected in parallel to receive the timing pulses through gating circuits. When the last output pulse is formed, the discriminator circuit generates a pulse which operates the reset circuit 41. The reset circuit provides an output pulse which serves to reset the pre-set counter 36, the discriminator 39 and the bistable circuit 13. Operation of the bistable circuit by the reset pulse serves to close the main gate 34 and to open the gate 15 and the crystal gate 19 which supplies the negative feedback to damp the oscillations of the crystal bridge.

If the test output is coupled back to the input, the delay generator will generate pulses having a precise repetition rate that is a precise frequency.

Provision is also provided whereby an input frequency (Figure 1) of less than 1 mc. can be applied to the pre-set counter to get digital delay steps of other than 1 m. sec., 860,000 ERP's to get hundreds of yards for instance.

Apparatus was constructed as described and illustrated in the figures. The circuit components were as follows:

Delay line 214—600Ω, 0.25 μsec. delay.

Transformers 297, 309, 386 and 411 were known by manufacturer's specifications as Toroid Type H Teroramic 20–40 turns.

The tubes were known by manufacturer's specifications as follows:

| | |
|---|---|
| Tubes **116** and **127** | 5965 |
| Tubes **144** and **146** | 5965 |
| Tubes **171** and **172** | 5965 |
| Tubes **201** and **204** | 5965 |
| Tube **226** | 6AS6/5725 |
| Tube **242** | 6AH6 |
| Tube **261** | 6AH6 |
| Tubes **274** and **283** | 6J6 |
| Tubes **279** and **280** | TT5965 |

| | |
|---|---|
| Tube **291** | 6AK5 |
| Tube **292** | 6AK5 |
| Tube **303** | 6AS6/5725 |
| Tubes **342** and **343** | 12AT7 |
| Tubes **344** and **346** | 12AT7 |
| Tubes **371** and **377** | 5687 |
| Tube **403** | 6C4's |
| Tube **406** | 6AS6/5725 |
| Tube **407** | 6AS6 |
| Tube **408** | 6AS6 |
| Tube **416** | 6AU6 |
| Tubes **462** and **481** | 5965 |

The diodes were known by manufacturer's specifications as follows:

| | |
|---|---|
| Diodes **82–85**, each | HP 212–G11A. |
| Diodes **92–95**, each | HP 212–G11A. |
| Diode **186** | HP 212–G11A. |
| Diode **189** | HP 212–G11A. |
| Diode **203** | HP 212–G11A. |
| Diodes **209–211**, each | HP 212–G11A. |
| Diode **227** | HP 212–G11A. |
| Diode **271** | HP 212–G11A. |
| Diode **302** | HP 212–G11A. |
| Diode **312** | HP 212–G11A. |
| Diode **349** | HP 212–G11A. |
| Diode **351** | HP 212–G11A. |
| Diode **392** | IN 55. |
| Diode **467** | HP 212–G11A. |
| Diode **471** | HP 212–G11A. |
| Diode **473** | HP 212–G11A. |
| Diode **488** | HP 212–G11A. |
| Diode **431** | IN 55. |
| Diode **389** | IN 55. |

The inductors had the following values:

| | | |
|---|---|---|
| L196 | μh | 80/120 |
| L199 | μh | 80/120 |
| L234 | μh | 80/120 |
| L251 | μh | 600/1200 |
| L267 | μh | 80/120 |
| L278 | μh | 80/120 |
| L294 | μh | 19 |
| L423 | μh | 15 |
| L479 | μh | 35 |
| L486 | μh | 100 |

The capacitors had the following values:

| | | |
|---|---|---|
| C109 | μf | 0.1 |
| C120 | μμf | 470 |
| C121 | μf | .254 |
| C122 | μf | .0254 |
| C125 | μf | .02 |
| C142 | μμf | 470 |
| C153 | μμf | 27 |
| C157 | μμf | 22 |
| C174 | μf | .0022 |
| C177 | μμf | 10 |
| C178 | μμf | 10 |
| C187 | μμf | 22 |
| C191 | μμf | 22 |
| C230 | μf | .005 |
| C235 | μμf | 390 |
| C236 | μμf | 390 |
| C237 | μf | 1.5–7 |
| C239 | μμf | 15 |
| C241 | μμf | 5–20 |
| C245 | μf | .02 |
| C247 | μf | .005 |
| C249 | μμf | 56 |
| C253 | μμf | 100 |
| C262 | μμf | 100 |
| C265*b* | μf | .02 |
| C266 | μf | .005 |
| C272 | μμf | 56 |

| | | |
|---|---|---|
| C273 | μμf | 5 |
| C275 | μμf | 240 |
| C276 | μμf | 240 |
| C277 | μf | .01 |
| C281*b* | μμf | 390 |
| C286 | μμf | 390 |
| C300 | μμf | 10 |
| C308 | μf | .02 |
| C314 | μμf | 390 |
| C317 | μμf | 390 |
| C321 | μμf | 390 |
| C350 | μμf | 390 |
| C354 | μμf | 47 |
| C358 | μμf | 22 |
| C359 | μμf | 47 |
| C363 | μμf | 390 |
| C362 | μμf | 390 |
| C367 | μμf | 390 |
| C368 | μμf | 390 |
| C383 | μμf | 47 |
| C388 | μμf | 390 |
| C398 | μf | .051 |
| C402 | μμf | 10 |
| C419 | μμf | .01 |
| C424 | μμf | 270 |
| C427 | μf | .01 |
| C434 | μf | .01 |
| C449 | μf | .01 |
| C451 | μμf | 105 |
| C461 | μf | 27 |
| C466 | μf | .005 |
| C472 | μf | .01 |
| C482 | μf | .100 |
| C483 | μf | .7–45 |
| C501 | μf | .005 |
| C503 | μf | .01 |

The resistors had the following values:

| | |
|---|---|
| R62 | 10 KΩ |
| R63 | 22 KΩ |
| R64 | 33 KΩ |
| R67 | 22 KΩ |
| R68 | 33 KΩ |
| R71 | 33 KΩ |
| R111 | 470 KΩ |
| R112 | 3.3 MΩ |
| R117 | 4.7 KΩ |
| R118 | 4.7 KΩ |
| R128 | 25 KΩ |
| R129 | 1.2 KΩ |
| R131 | 1.2 KΩ |
| R133 | 680 KΩ |
| R134 | 100 KΩ |
| R137 | 50 KΩ |
| R138 | 3.3 KΩ |
| R141 | 250 Ω |
| R143 | 10 KΩ |
| R147 | 3.3 KΩ |
| R148 | 4.7 KΩ |
| R149 | 22 KΩ |
| R150 | 1.2 M |
| R151 | 370 K |
| R152 | 284 KΩ |
| R155 | 27 KΩ |
| R156 | 180 KΩ |
| R176 | 5.6 KΩ |
| R179 | 136.7 KΩ |
| R181 | 92.6 KΩ |
| R182 | 136.7 KΩ |
| R183 | 92.6 KΩ |
| R192 | 22 KΩ |
| R193 | 22 KΩ |
| R194 | 1.8 KΩ |
| R197 | 1.8 KΩ |
| R198 | 1.5 KΩ |

| | |
|---|---|
| R202 | 56 KΩ |
| R206 | 18 KΩ |
| R207 | 10 KΩ |
| R208 | 470 KΩ |
| R228 | 12 KΩ |
| R232 | 150 Ω |
| R243 | 180 Ω |
| R244 | 100 KΩ |
| R246 | 100 KΩ |
| R252 | 10 KΩ |
| R254 | 100 KΩ |
| R263 | 100 KΩ |
| R264 | 82 KΩ |
| R265*a* | 180 Ω |
| R268 | 100 Ω |
| R269 | 18 KΩ |
| R281*a* | 212 KΩ |
| R282 | 27 KΩ |
| R284 | 18 K |
| R287 | 470 KΩ |
| R288 | 330 KΩ |
| R289 | 200 KΩ |
| R293 | 6.6 KΩ |
| R295 | 560 KΩ |
| R296 | 1.5 KΩ |
| R298 | 90 KΩ |
| R297 | 90 KΩ |
| R301 | 220 Ω |
| R306 | 10 KΩ |
| R307 | 100 KΩ |
| R311 | 220 Ω |
| R313 | 390 Ω |
| R316 | 820 Ω |
| R318 | 680 Ω |
| R319 | 18 KΩ |
| R347 | 10 KΩ |
| R348 | 10 KΩ |
| R352 | 22 KΩ |
| R353 | 22 KΩ |
| R356 | 136.7 KΩ |
| R357 | 136.7 KΩ |
| R361 | 136.7 KΩ |
| R362 | 136.7 KΩ |
| R369 | 180 Ω |
| R374 | 100 KΩ |
| R376 | 77.5 KΩ |
| R377 | 180 Ω |
| R378 | 180 Ω |
| R379 | 82 KΩ |
| R380 | 560 K |
| R386 | 22 KΩ |
| R387 | 120 K |
| R391 | 5600 Ω |
| R393 | 470 Ω |
| R396 | 100 Ω |
| R397 | 150 Ω |
| R401 | 100 KΩ |
| R404 | 6800 Ω |
| R405 | 220 KΩ |
| R422 | 3.9 KΩ |
| R426 | 18 KΩ |
| R428 | 1 KΩ |
| R430 | 100 KΩ |
| R436 | 20 KΩ |
| R437 | 47 KΩ |
| R438 | 3300 Ω |
| R442 | 100 KΩ |
| R443 | 91 KΩ |
| R444 | 9.1 KΩ |
| R446 | 2700 Ω |
| R464 | 30 KΩ |

| | |
|---|---|
| R468 | 180 KΩ |
| R469 | 1000 Ω |
| R474 | 560 Ω |
| R476 | 5000 Ω |
| R477 | 100 KΩ |
| R478 | 3900 Ω |
| R484 | 22 KΩ |
| R485 | 100 KΩ |
| R496 | 10 KΩ |
| R499 | 270 KΩ |
| R502 | 3.3 MΩ |

The voltages applied were as follows:

| | Volts |
|---|---|
| $+V$ | +285 |
| $+V_1$ | +180 |
| $-V$ | −195 |
| $-V_1$ | −105 |
| $-V_2$ | −110 |

Apparatus was constructed in accordance with the foregoing and tested and served to give a pair of timing pulses which could be independently varied between one and 10,000 microseconds. The means for generating a reset pulse which serves to form the beam when the instrument is energized or when fluctuations in line voltage extinguish the beam operated satisfactorily.

Subject matter described but not claimed in this application is described and claimed in a co-pending application filed simultaneously herewith.

We claim:

1. A delay generator comprising a pulsed oscillator serving to generate pulsed sinusoidal oscillations, first gating means for initiating said oscillations, means connected to receive said oscillations and serving to produce pulses each time the sinusoidal oscillations reach a predetermined amplitude, counting means adapted to be pre-set to a plurality of predetermined counts connected to receive and count said pulses and serving to form an output pulse each time a pre-set count is reached, second gating means to control the application of said pulses to said counting means, means for actuating simultaneously said first and second gating means, and reset means connected to receive said output pulses and serving to reset the counting means when the last output pulse is formed.

2. A delay generator comprising a pulsed oscillator serving to generate pulsed sinusoidal oscillations, first gating means for initiating said oscillations, means connected to receive said oscillations and serving to produce pulses each time the sinusoidal oscillations reach a predetermined amplitude, counting means adapted to be pre-set to a plurality of predetermined counts connected to receive and count said pulses and serving to form an output pulse each time a pre-set count is reached, second gating means to control the application of said pulses to said counting means, means for opening simultaneously said first and second gating means, reset means connected to receive said output pulses and serving to reset the counting means when the last output pulse is formed, and means to close simultaneously said first and second gating means in response to the operation of said reset means.

References Cited in the file of this patent

UNITED STATES PATENTS

| | | |
|---|---|---|
| 2,113,011 | White | Apr. 5, 1938 |
| 2,566,078 | Bliss | Aug. 28, 1951 |
| 2,638,541 | Wallmark | May 12, 1953 |
| 2,724,553 | Faulkner | Nov. 22, 1955 |
| 2,770,725 | Lentz | Nov. 13, 1956 |
| 2,788,940 | Terry et al. | Apr. 16, 1957 |
| 2,789,267 | Beal et al. | Apr. 16, 1957 |
| 2,807,419 | Rabenda | Sept. 24, 1957 |